No. 813,166. PATENTED FEB. 20, 1906.
J. E. NEWTON.
SHOVEL.
APPLICATION FILED FEB. 17, 1905.
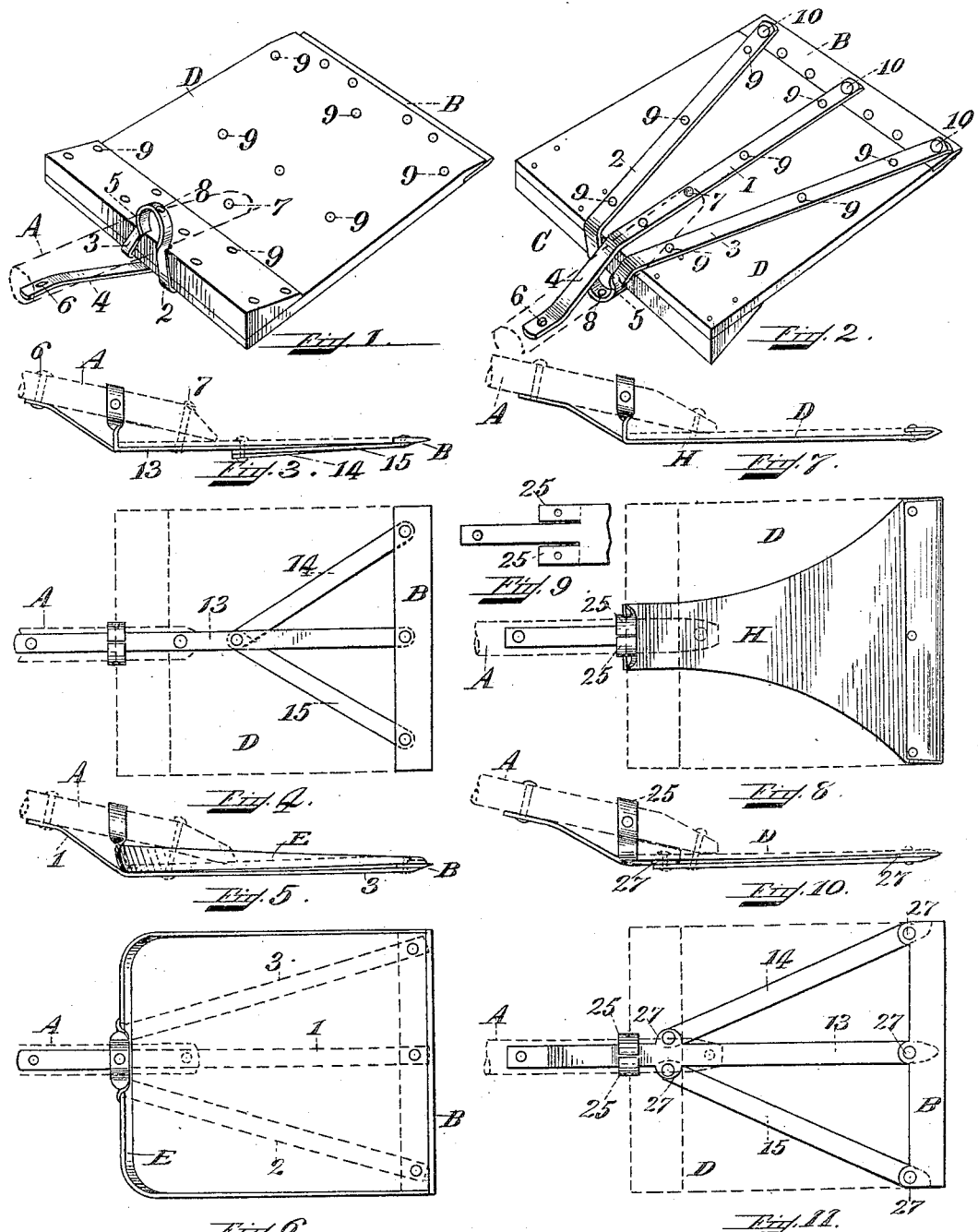
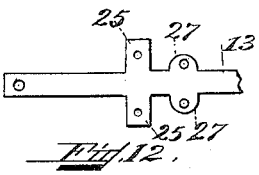

UNITED STATES PATENT OFFICE.

JAMES EDWARD NEWTON, OF FALL RIVER, MASSACHUSETTS.

SHOVEL.

No. 813,166.          Specification of Letters Patent.          Patented Feb. 20, 1906.

Application filed February 17, 1905. Serial No. 245,997.

*To all whom it may concern:*

Be it known that I, JAMES EDWARD NEWTON, a citizen of the United States, residing at Fall River, in the county of Bristol and State of Massachusetts, have invented certain new and useful Improvements in Shovels, of which the following is a specification.

My invention relates to shovels, and has for its object the provision of means whereby a shovel may be strong and durable, yet very light in weight. It is particularly applicable to snow-shovels, the scoop of which is usually made of wood and has its working edge shod with iron. In such a snow-shovel the handle and the working edge are made fast to the wooden portion or scoop, usually of soft light wood, yet thick enough to enable the scoop rigidly to resist a thrust. This thrust is transmitted through the scoop, and as a result after some use the handle, scoop, working edge, and fastenings become loose and the shovel is rendered useless. Such a shovel, while it has the advantage of cheapness, is short-lived.

Now the principal feature of my invention resides in means whereby any thrust upon the shovel is transmitted, not through the scoop, but through means independent thereof, operatively connecting the handle with the working edge of the shovel, the scoop in no way resisting the thrusts, but simply performing the function of holding the snow or other material gathered therein.

A shovel embodying my invention is very strong, light in weight, and durable, and, further, the cost of construction is small.

Figure 1 is a perspective top view of my invention embodied in a wooden snow-shovel, the handle of said shovel being shown in dotted lines for the sake of clearness. Fig. 2 is a perspective bottom view of what is shown in Fig. 1. Figs. 3 and 4 are a side and a plan view of a modification, the handle and the scoop being dotted in. Figs. 5 and 6 are a side and a plan view of my invention, the scoop being of thin metal instead of wood and the handle being dotted in. Figs. 7 and 8 are a side and a plan view of a modification, and Fig. 9 is a detail. Figs. 10 and 11 show another modification, and Fig. 12 is a detail.

In the drawings illustrating the principle of my invention and the best method now known to me of applying said principle a shovel is shown consisting of a handle A, operatively connected to a working edge portion B by means C and a scoop D, mounted upon said means C.

Having reference to Figs. 1 and 2, the connecting means consists of three rods 1 2 3, whose end portions are fixed to the edge portion B and whose opposite end portions are fixed to the handle A. To permit the handle A to be inclined, as is usually the case, to the scoop D, the rod 1 is bent upwardly at its inner portion 4, and the inner portion 5 of the two converging rods 2 3 is bent up and looped to receive the shank of the handle A. The handle A is secured to the rod 1, as by rivets 6 7, and also to the rods 2 3, as by a pin 8, while these rods are fixed to the working edge by rivets 10 10. It will now be plain that the handle A is rigidly fixed to the working edge B, and the handle, rods, and working edge are bound together and form one rigid combination of elements.

The scoop D, of any desired shape, is fitted upon the rods 1 2 3, adjusted to the working edge B, and secured in any suitable way, as by small rivets 9 9.

The operation of my invention is as follows: Let us suppose the shovel is pushed against a piece of ice on a sidewalk. A thrust given at the handle is transmitted to the rods 1 2 3, which in turn pass it on to and through the working edge B. The ice resists the thrust and reacts through said parts; but it will be obvious that the scoop D is not affected by this action and reaction, because it is simply supported upon the rods 1 2 3 and the working edge portion B. In fine, any resistance to be overcome by the shovel is borne by the handle, rods, and working edge and not by the scoop, as is the case with shovels heretofore constructed.

In Figs. 3 and 4 the handle is made fast only to one rod 13, and the two converging rods 14 and 15 are connected with rod 13.

In Figs. 5 and 6 the handle, rods, and working edge portion are substantially the same as in the preferred form shown in Figs. 1 and 2; but the scoop represented is of thin metal stamped into the desired shape. This construction is very light in weight, strong and durable, and capable of very successful use in moving coal and the like.

In Figs. 7 and 8 is shown another modification. The means connecting the handle with the working edge is made in one piece H and is designed here to sustain a wooden scoop, Fig. 9 showing the ears 25 before they are bent up to receive the shank of the handle which is pinned therein.

Figs. 10 and 11 show substantially the same construction as is shown in Figs. 3, 4, except the side rods 14 15 are riveted to ears 27, projecting from the middle rod 13 and from working edge portion B, Fig. 12 showing the form of the middle rod 13 as it comes from the stamp.

Having described my invention, and desiring to claim it in the broadest manner legally possible, what I claim is—

A shovel, consisting of a handle; a working edge portion; a rod connecting said working edge portion with said handle; a second rod whose free ends are connected with said working edge portion, and whose middle portion is bent and forms a loop for the reception, and the fastening thereto, of the shank of the shovel; and a scoop.

In testimony whereof I affix my signature in presence of two witnesses.

JAMES EDWARD NEWTON.

Witnesses:
RICHARD P. BORDEN,
ROBERT C. DAVIS.